United States Patent Office 2,836,571
Patented May 27, 1958

2,836,571

PRODUCTION OF p-METHYL BENZYL CHLORIDE POLYMERS BY PYROLYSIS

Luther A. R. Hall, Wilmington, Del., assignor to E. I. du Pont de Nemours and Company, Wilmington, Del., a corporation of Delaware No Drawing. Application January 10, 1956
Serial No. 558,184

2 Claims. (Cl. 260—2)

This invention relates to a chemical process. More specifically it relates to a process for the preparation of a polymer having recurring units of the structure —(CH$_2$—Ar—CH$_2$)— wherein —Ar— is a divalent carbocyclic aromatic radical, i. e., it contains resonant unsaturation.

It is an object of the present invention to provide a novel process for the preparation of a polymer as defined above.

This and other objects will become apparent in the course of the following specification and claims.

In accordance with the present invention a process for the preparation of a polymer having the structure defined above is provided which comprises pyrolyzing a monomer having the formula:

H$_3$C—Ar—CH$_2$Cl where —Ar— is as defined above.

The monomer is polymerized by a process wherein it is vaporized, pyrolyzed and thereafter cooled. Polymer formation occurs on the wall of the cooling chamber. Pyrolysis is performed within a tube, preferably packed with inert particles to improve heat transfer. At times it has been found advisable to dilute the monomer vapor with an innocuous gas such as nitrogen.

The following example illustrates the preparation of poly-p-xylene from p-methylbenzyl chloride.

*Example I*

Liquid p-methylbenzyl chloride is vaporized under reduced pressure as a temperature of 102° C. The effiux vapors are introduced at a pressure of 1.7 mm. into a 15-inch quartz tube with an inside diameter of 1.38 inches packed with small pieces of quartz tubing. The flow is controlled so that about 26 grams of monomer are consumed per hour. The pyrolysis tube is maintained at a temperature of 750° C. The pyrolyzed gases then pass into a receiver maintained at about room temperature. Polymer is deposited on the walls of the receiver. Monomer is recovered in a low temperature trap. The unreacted gases are then led into a hydrogen chloride trap containing a 50% solution of potassium hydroxide in water. Chlorine may also be recovered. The yield of polymer is 65% at 40% conversion. The polymer is removed from the receiver as a thin, transparent, tough film. X-ray diffraction patterns indicate it to be poly-p-xylene.

While the invention has been illustrated in detail employing p-methylbenzyl chloride as monomer, other monomers such as o-methylbenzyl chloride, various naphthalenes of similar structure such as:

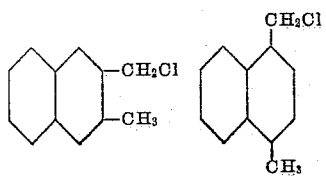

and

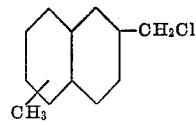

may also be employed. Furthermore such monomers when substituted in the aromatic nucleus with halogen, nitrile, alkyl, aryl, aralkyl, alkaryl, halogenoaryl, halogenoaralkyl groups or the like are likewise suitable. Copolymers may be prepared from mixed monomers.

The temperature of vaporization will vary with the monomer employed. The method of vaporizing is not critical. It is sometimes convenient to drop the monomer directly into the pyrolysis tube. In this procedure, the liquid is vaporized on contact within the pyrolysis zone. Monomer vapor may also be formed by distilling the liquid from a still-pot connected to the gas inlet of the pyrolysis tube. Another variation entails the entraining of monomer vapors in a stream of nitrogen, steam or other gas introduced through a capillary at temperatures near the monomer boiling point. As previously pointed out, the use of such diluent gases is sometimes advantageous, particularly in control of reaction conditions.

The optimum rate of feed of monomer vapor into the pyrolysis zone will vary with the monomer, with the pressure in the system, and with the temperature in the pyrolysis zone. When p-methylbenzyl chloride vapors are exposed for an average of about 0.1 second to a temperature within the range from about 700° C. to about 850° C., a feed rate of about 13 grams per hour to about 26 grams per hour is satisfactory. Under these conditions, a feed rate of about 25 grams per hour is preferred.

The optimum temperature within the pyrolysis zone will depend upon the particular monomer or mixture of monomers being used. In general, for many of the halogen-containing monomers, the temperature should be at least about 700° C. to obtain any practical effect when the exposure time within the tube is about 0.1 second. Higher temperatures, below those at which rupture of carbon to carbon bonds occurs, may be employed without deleterious effects. A temperature within the range of from about 700° C. to about 850° C. is preferred when p-methylbenzyl chloride is used as the monomer.

The pressure at which pyrolysis is carried out may vary widely. Low pressures are generally used. The equipment employed in the pyrolysis is preferably of such design as to promote heat transfer. A baffle tube or one packed with inert particles has been found satisfactory. However, any zone heated to the proper temperature will be effective to some extent. During the pyrolysis an exposure over a period of at least about 0.01 second at the minimum pyrolysis temperature is considered necessary to activate the monomer for polymerization. Longer periods may be employed if desired.

Polymerization occurs upon passage of the pyrolyzed vapors over a cooled surface. The nature of the surface is not critical. Collection of polymer at room temperature is preferred. Where the temperature of the collecting medium is maintained at Dry Ice-acetone temperature (about $-70°$ C.), the polymer forms as a light, fluffy material. Monomer which is unreacted may be collected and recycled.

The products of the present invention are useful in the preparation of solvent-resistant coatings. For instance, the pyrolyzed vapors when directed upon cellulose acetate yarn or fabric, render it insoluble in acetone. Fibers can be prepared employing the system described in United States application Ser. No. 380,195, filed September 15, 1953, now Patent No. 2,744,085. Furthermore, films and coatings of this material are useful in many electrical applications, especially those involving high temperature operating conditions, for instance as insulation in motors and generators and as a dielectric material in condensers. Electrical characteristics are as follows:

| | |
|---|---|
| Dissipation factor | 0.00778 to 0.0017 |
| Dielectric constant | 3.30 to 4.10 |
| Specific resistance | $>1.5 \times 10^{15}$ |

This application is a continuation-in-part of United States application Ser. No. 360,381, filed June 8, 1953, now abandoned.

Many other modifications within the purview of the above invention will be apparent to those skilled in the art without a departure from the inventive concept.

What is claimed is:

1. A process for the preparation of a polymer having recurring units of the structure:

$$-(CH_2-Ar-CH_2)-$$

wherein —Ar— is a divalent carbocyclic aromatic radical which comprises pyrolyzing a monomer of the formula:

$$H_3C-Ar-CH_2Cl$$

and thereafter cooling the pyrolyzed vapors.

2. The process of claim 1 wherein —Ar— is —phenylene—.

References Cited in the file of this patent

UNITED STATES PATENTS 2,719,131    Hall _____ Sept. 27, 1955

OTHER REFERENCES

Farthing: J. Chem. Soc., pages 3261, 3262; October 1953. (Copy in Scientific Library.)